US010567555B2

(12) United States Patent
Yang et al.

(10) Patent No.: US 10,567,555 B2
(45) Date of Patent: Feb. 18, 2020

(54) METHODS AND APPARATUS FOR EARLY DETECTION OF HIGH EFFICIENCY WIRELESS PACKETS IN WIRELESS COMMUNICATION

(71) Applicant: QUALCOMM Incorporated, San Diego, CA (US)

(72) Inventors: Lin Yang, San Diego, CA (US); Bin Tian, San Diego, CA (US); Sameer Vermani, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 146 days.

(21) Appl. No.: 15/342,883

(22) Filed: Nov. 3, 2016

(65) Prior Publication Data

US 2017/0134540 A1 May 11, 2017

Related U.S. Application Data

(60) Provisional application No. 62/268,420, filed on Dec. 16, 2015, provisional application No. 62/252,300, filed on Nov. 6, 2015.

(51) Int. Cl.
*H04L 29/06* (2006.01)
*H04L 25/02* (2006.01)
(Continued)

(52) U.S. Cl.
CPC ............ *H04L 69/22* (2013.01); *H04L 1/0005* (2013.01); *H04L 1/0083* (2013.01);
(Continued)

(58) Field of Classification Search
CPC ... H04L 69/22; H04L 1/0005; H04L 25/0202; H04L 1/0083; H04L 27/2618; H04L 5/0048; H04L 5/0053; H04L 27/2613
See application file for complete search history.

(56) References Cited

U.S. PATENT DOCUMENTS

2012/0269124 A1* 10/2012 Porat ................. H04W 72/1231
370/328
2013/0315163 A1* 11/2013 Zhang .................... H04L 5/001
370/329
(Continued)

FOREIGN PATENT DOCUMENTS

WO WO-2016044440 A1 3/2016

OTHER PUBLICATIONS

International Search Report and Written Opinion—PCT/US2016/060517—ISA/EPO—dated Feb. 7, 2017.
(Continued)

*Primary Examiner* — Oussama Roudani
(74) *Attorney, Agent, or Firm* — Paradice and Li LLP/Qualcomm

(57) ABSTRACT

A method for wireless communication is provided. The method includes receiving, at a wireless device, a packet including a first field over a first number of tones, and a second field over a second number of tones. The second number of tones is greater than the first number of tones by a number of one or more edge tones carrying data. The method further includes determining at least one of a communication mode and a channel estimation based at least in part on the one or more edge tones carrying data.

18 Claims, 8 Drawing Sheets

(51) Int. Cl.
  *H04L 5/00* (2006.01)
  *H04L 27/26* (2006.01)
  *H04L 1/00* (2006.01)

(52) U.S. Cl.
  CPC .......... *H04L 5/0048* (2013.01); *H04L 5/0053* (2013.01); *H04L 25/0202* (2013.01); *H04L 27/2613* (2013.01); *H04L 27/2618* (2013.01)

(56) References Cited

U.S. PATENT DOCUMENTS

| | | | |
|---|---|---|---|
| 2013/0343478 A1 | 12/2013 | Yang et al. | |
| 2015/0139206 A1* | 5/2015 | Azizi | H04L 5/003 370/338 |
| 2015/0296517 A1* | 10/2015 | Yu | H04L 25/03866 370/338 |
| 2016/0043783 A1* | 2/2016 | Xia | H04B 7/0417 370/329 |
| 2017/0181034 A1* | 6/2017 | Lee | H04W 28/065 |
| 2018/0123757 A1* | 5/2018 | Ko | H04L 5/0048 |

OTHER PUBLICATIONS

Xiang, Z. et al., "Content for the extra tones in LSIG and RLSIG ; 11-16-0046-00-00ax-content-for-the-extra-tones-in-lsig-andrlsig", IEEE Draft; 11-16-0046-00-00AX-Content-for-Theextra-Tones-in-LSIG-and-RLSIG, IEEE-SA Mentor, Piscataway, NJ USA, vol. 802.11ax, Jan. 18, 2016 (Jan. 18, 2016), XP06810480.1, pp. 1-16.

Son J. et al., Discussions on HE SIG-A Structure, 11-15-1119-01-00ax-discussions-on-he-sig-a-structure, IEEE Draft, 11-15-1119-01-00AX-Discussions-on-HE-SIG-A-Structure, IEEE-SA Mentor, Piscataway, NJ USA, vol. 802.11ax, No. 1, Sep. 16, 2015, XP068098370, pp. 1-8.

Li P. et al., (Philips): "IEEE 802.11 TGn—Enhancements of 802.11 a/g based MIMO-OFDM System (presentation), 11-04-0945-03-000nieee-802-11-tgn-enhancements-802-11 ag-based-mimo-ofdm-system Presentation", IEEE Draft, 11-04-0945-03-000N-IEEE-802-11-TGN-Enhancements-802-11 AG-Based-MIMO-OFDM-System Presentation, IEEE-SA Mentor, Piscataway, NJ USA, vol. 802.11n, No. 3, Sep. 14, 2004, XP017690357, pp. 1-68.

* cited by examiner

METHODS AND APPARATUS FOR EARLY DETECTION OF HIGH EFFICIENCY WIRELESS PACKETS IN WIRELESS COMMUNICATION

PRIORITY CLAIM

This application claims priority to U.S. Provisional Application No. 62/252,300, filed Nov. 6, 2015; and U.S. Provisional Application No. 62/268,420, filed Dec. 16, 2015; each of which is hereby incorporated herein by reference in its entirety.

FIELD

Certain aspects of the present disclosure generally relate to wireless communications, and more particularly, to methods and apparatus for early detection of high efficiency wireless (HEW) packets in wireless communication.

BACKGROUND

In many telecommunication systems, communications networks are used to exchange messages among several interacting spatially-separated devices. Wireless networks are often preferred when the network elements are mobile and thus have dynamic connectivity needs, or if the network architecture is formed in an ad hoc, rather than fixed, topology.

As faster and more efficient wireless communication protocols are developed, there becomes a need for differentiating between the different wireless communication protocols to ensure compatibility between different WiFi standards. Because data for configuring or parsing the remainder of a data packet can be included in one more fields or symbols of a preamble of the data packet, it can be desirable for a receiving device to be able to determine a received data packet's communication protocol after receiving and processing as little of the preamble as possible. Thus, there is a need for methods and apparatus for early detection of high efficiency wireless (HEW) packets in wireless communication.

SUMMARY

Various implementations of systems, methods and devices within the scope of the appended claims each have several aspects, no single one of which is solely responsible for the desirable attributes described herein. Without limiting the scope of the appended claims, some features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect provides a method of wireless communication. The method includes receiving, at a wireless device, a packet including a first field over a first number of tones, and a second field over a second number of tones. The second number of tones is greater than the first number of tones by a number of one or more edge tones carrying data. The method further includes determining at least one of a communication mode and a channel estimation based at least in part on the one or more edge tones carrying data.

In various embodiments, the first number is 52 and the second number is 56. In various embodiments, the training field can include a legacy short training field and the signal field can include a legacy long training field. In various embodiments, a polarity of the one or more edge tones carrying data indicates at least one of: a modulation and coding scheme (MCS) of a subsequent field, a delay spread protection mode, and a packet transmission mode.

In various embodiments, a polarity of the one or more edge tones carrying data indicates at least a portion of a high throughput long training sequence. In various embodiments, a pattern of the one or more edge tones indicates additional data. In various embodiments, the method can further include receiving a repeated legacy signal field over the second number of tones, wherein the one or more edge tones of the repeated legacy signal field carry data.

In various embodiments, the training field can include a legacy long training field and the signal field can include a legacy signal field. In various embodiments, the wireless device can be a mobile station, and the mobile station can be configured to receive the packet through a receiver and an antenna of the mobile station from an access point serving the mobile station.

In various embodiments, the one or more edge tones can include two positive polarity tones at each lower edge of each of a plurality of 20 MHz sub-channels, and two negative polarity tones at each upper edge of each of the plurality of 20 MHz sub-channels. In various embodiments, the one or more edge tones can include two tones at each edge of each of a plurality of 20 MHz sub-channels, the one or more edge tones having values sufficient to minimize a peak-to-average power ratio during transmission of the second field.

Another aspect provides an apparatus configured to wirelessly communicate. The apparatus includes a receiver configured to receive a packet including a first field over a first number of tones, and a second field over a second number of tones. The second number of tones is greater than the first number of tones by a number of one or more edge tones carrying data. The apparatus further includes a memory that stores instructions. The apparatus further includes a processor coupled with the memory and configured to execute the instructions to determine at least one of a communication mode and a channel estimation based at least in part on the one or more edge tones carrying data.

In various embodiments, the first number is 52 and the second number is 56. In various embodiments, the training field can include a legacy short training field and the signal field can include a legacy long training field. In various embodiments, a polarity of the one or more edge tones carrying data indicates at least one of: a modulation and coding scheme (MCS) of a subsequent field, a delay spread protection mode, and a packet transmission mode.

In various embodiments, a polarity of the one or more edge tones carrying data indicates at least a portion of a high throughput long training sequence. In various embodiments, a pattern of the one or more edge tones indicates additional data. In various embodiments, the receiver can be further configured to receive a legacy signal field over the second number of tones, and the one or more edge tones of the legacy signal field can carry data.

In various embodiments, the training field can include a legacy long training field and the signal field can include a legacy signal field. In various embodiments, the apparatus can be a mobile station, and the processor can be configured to receive the packet through a receiver and an antenna of the mobile station from an access point serving the mobile station.

In various embodiments, the one or more edge tones can include two positive polarity tones at each lower edge of each of a plurality of 20 MHz sub-channels, and two negative polarity tones at each upper edge of each of the plurality of 20 MHz sub-channels. In various embodiments, the one or more edge tones can include two tones at each edge of each of a plurality of 20 MHz sub-channels, the one or more edge tones having values sufficient to minimize a peak-to-average power ratio during transmission of the second field.

Another aspect provides another apparatus for wireless communication. The apparatus includes means for receiving a packet including a first field over a first number of tones, and a second field over a second number of tones. The second number of tones is greater than the first number of tones by a number of one or more edge tones carrying data. The apparatus further includes means for determining at least one of a communication mode and a channel estimation based at least in part on the one or more edge tones carrying data.

In various embodiments, the first number is 52 and the second number is 56. In various embodiments, the training field can include a legacy short training field and the signal field can include a legacy long training field. In various embodiments, a polarity of the one or more edge tones carrying data indicates at least one of: a modulation and coding scheme (MCS) of a subsequent field, a delay spread protection mode, and a packet transmission mode.

In various embodiments, a polarity of the one or more edge tones carrying data indicates at least a portion of a high throughput long training sequence. In various embodiments, a pattern of the one or more edge tones indicates additional data. In various embodiments, the apparatus can further include means for receiving a legacy signal field over the second number of tones and the one or more edge tones of the legacy signal field can carry data.

In various embodiments, the training field can include a legacy long training field and the signal field can include a legacy signal field. In various embodiments, the one or more edge tones can include two positive polarity tones at each lower edge of each of a plurality of 20 MHz sub-channels, and two negative polarity tones at each upper edge of each of the plurality of 20 MHz sub-channels. In various embodiments, the one or more edge tones can include two tones at each edge of each of a plurality of 20 MHz sub-channels, the one or more edge tones having values sufficient to minimize a peak-to-average power ratio during transmission of the second field.

Another aspect provides a non-transitory computer-readable medium. The medium includes code that, when executed, causes an apparatus to receive a packet including a first field over a first number of tones, and a second field over a second number of tones. The second number of tones is greater than the first number of tones by a number of one or more edge tones carrying data. The medium further includes code that, when executed, causes the apparatus to determine at least one of a communication mode and a channel estimation based at least in part on the one or more edge tones carrying data.

In various embodiments, the first number is 52 and the second number is 56. In various embodiments, the training field can include a legacy short training field and the signal field can include a legacy long training field. In various embodiments, a polarity of the one or more edge tones carrying data indicates at least one of: a modulation and coding scheme (MCS) of a subsequent field, a delay spread protection mode, and a packet transmission mode.

In various embodiments, a polarity of the one or more edge tones carrying data indicates at least a portion of a high throughput long training sequence. In various embodiments, a pattern of the one or more edge tones indicates additional data. In various embodiments, the medium can further include code that, when executes, causes the apparatus to receive a repeated legacy signal field over the second number of tones, wherein the one or more edge tones of the repeated legacy signal field carry data.

In various embodiments, the training field can include a legacy long training field and the signal field can include a legacy signal field. In various embodiments, the apparatus can be a mobile station, and the mobile station can be configured to receive the packet through a receiver and an antenna of the mobile station from an access point serving the mobile station.

In various embodiments, the one or more edge tones can include two positive polarity tones at each lower edge of each of a plurality of 20 MHz sub-channels, and two negative polarity tones at each upper edge of each of the plurality of 20 MHz sub-channels. In various embodiments, the one or more edge tones can include two tones at each edge of each of a plurality of 20 MHz sub-channels, the one or more edge tones having values sufficient to minimize a peak-to-average power ratio during transmission of the second field.

Another aspect provides another method of wireless communication. The method includes generating, at a wireless device, a packet including a first field over a first number of tones, and a second field over a second number of tones. The second number of tones is greater than the first number of tones by a number of one or more edge tones carrying data. The data indicating at least one of a communication mode and a channel estimation. The method further includes transmitting the packet according to the communication mode.

In various embodiments, the first number is 52 and the second number is 56. In various embodiments, the training field can include a legacy short training field and the signal field can include a legacy long training field. In various embodiments, a polarity of the one or more edge tones carrying data indicates at least one of: a modulation and coding scheme (MCS) of a subsequent field, a delay spread protection mode, and a packet transmission mode.

In various embodiments, a polarity of the one or more edge tones carrying data indicates at least a portion of a high throughput long training sequence. In various embodiments, a pattern of the one or more edge tones indicates additional data. In various embodiments, the method can further include transmitting a repeated legacy signal field over the second number of tones, wherein the one or more edge tones of the repeated legacy signal field carry data.

In various embodiments, the training field can include a legacy long training field and the signal field can include a legacy signal field. In various embodiments, the wireless device can be an access point, and the access point can be configured to transmit the packet through a transmitter and an antenna of the access point to a mobile station from the access point serving the mobile station.

In various embodiments, the one or more edge tones can include two positive polarity tones at each lower edge of each of a plurality of 20 MHz sub-channels, and two negative polarity tones at each upper edge of each of the plurality of 20 MHz sub-channels. In various embodiments, the one or more edge tones can include two tones at each edge of each of a plurality of 20 MHz sub-channels, the one or more edge tones having values sufficient to minimize a peak-to-average power ratio during transmission of the second field.

Another aspect provides another apparatus configured to wirelessly communicate. The apparatus includes a memory that stores instructions. The apparatus further includes a processor coupled with the memory and configured to execute the instructions to generate a packet including a first field over a first number of tones, and a second field over a second number of tones. The second number of tones is greater than the first number of tones by a number of one or more edge tones carrying data. The data indicating at least one of a communication mode and a channel estimation. The apparatus further includes a transmitter configured to transmit the packet according to the communication mode.

In various embodiments, the first number is 52 and the second number is 56. In various embodiments, the training field can include a legacy short training field and the signal field can include a legacy long training field. In various embodiments, a polarity of the one or more edge tones carrying data indicates at least one of: a modulation and coding scheme (MCS) of a subsequent field, a delay spread protection mode, and a packet transmission mode.

In various embodiments, a polarity of the one or more edge tones carrying data indicates at least a portion of a high throughput long training sequence. In various embodiments, a pattern of the one or more edge tones indicates additional data. In various embodiments, the transmitter can be further configured to transmit a legacy signal field over the second number of tones, and the one or more edge tones of the legacy signal field can carry data.

In various embodiments, the training field can include a legacy long training field and the signal field can include a legacy signal field. In various embodiments, the wireless device can be an access point, and the processor can be configured to transmit the packet through a transmitter and an antenna of the access point to a mobile station from the access point serving the mobile station. In various embodiments, the wireless device can be an access point, and the processor can be configured to transmit the packet through a transmitter and an antenna of the access point to a mobile station from the access point serving the mobile station.

In various embodiments, the one or more edge tones can include two positive polarity tones at each lower edge of each of a plurality of 20 MHz sub-channels, and two negative polarity tones at each upper edge of each of the plurality of 20 MHz sub-channels. In various embodiments, the one or more edge tones can include two tones at each edge of each of a plurality of 20 MHz sub-channels, the one or more edge tones having values sufficient to minimize a peak-to-average power ratio during transmission of the second field.

Another aspect provides another apparatus for wireless communication. The apparatus includes means for generating a packet including a first field over a first number of tones, and a second field over a second number of tones. The second number of tones is greater than the first number of tones by a number of one or more edge tones carrying data. The data indicating at least one of a communication mode and a channel estimation. The apparatus further includes means for transmitting the packet according to the communication mode.

In various embodiments, the first number is 52 and the second number is 56. In various embodiments, the training field can include a legacy short training field and the signal field can include a legacy long training field. In various embodiments, a polarity of the one or more edge tones carrying data indicates at least one of: a modulation and coding scheme (MCS) of a subsequent field, a delay spread protection mode, and a packet transmission mode.

In various embodiments, a polarity of the one or more edge tones carrying data indicates at least a portion of a high throughput long training sequence. In various embodiments, a pattern of the one or more edge tones indicates additional data. In various embodiments, the apparatus can further include means for transmitting a legacy signal field over the second number of tones, and the one or more edge tones of the legacy signal field can carry data.

In various embodiments, the training field can include a legacy long training field and the signal field can include a legacy signal field. In various embodiments, the wireless device can be an access point, and the access point can be configured to transmit the packet through a transmitter and an antenna of the access point to a mobile station from the access point serving the mobile station.

In various embodiments, the one or more edge tones can include two positive polarity tones at each lower edge of each of a plurality of 20 MHz sub-channels, and two negative polarity tones at each upper edge of each of the plurality of 20 MHz sub-channels. In various embodiments, the one or more edge tones can include two tones at each edge of each of a plurality of 20 MHz sub-channels, the one or more edge tones having values sufficient to minimize a peak-to-average power ratio during transmission of the second field.

Another aspect provides another non-transitory computer-readable medium. The medium includes code that, when executed, causes an apparatus to generate a packet including a first field over a first number of tones, and a second field over a second number of tones. The second number of tones is greater than the first number of tones by a number of one or more edge tones carrying data. The data indicating at least one of a communication mode and a channel estimation. The medium further includes code that, when executed, causes the apparatus to transmit the packet according to the communication mode.

In various embodiments, the first number is 52 and the second number is 56. In various embodiments, the training field can include a legacy short training field and the signal field can include a legacy long training field. In various embodiments, a polarity of the one or more edge tones carrying data indicates at least one of: a modulation and coding scheme (MCS) of a subsequent field, a delay spread protection mode, and a packet transmission mode.

In various embodiments, a polarity of the one or more edge tones carrying data indicates at least a portion of a high throughput long training sequence. In various embodiments, a pattern of the one or more edge tones indicates additional data. In various embodiments, the medium can further include code that, when executed, causes the apparatus to transmit a legacy signal field over the second number of tones, and the one or more edge tones of the legacy signal field can carry data.

In various embodiments, the training field can include a legacy long training field and the signal field can include a legacy signal field. In various embodiments, the wireless device can be an access point, and the access point can be configured to transmit the packet through a transmitter and an antenna of the access point to a mobile station from the access point serving the mobile station.

In various embodiments, the one or more edge tones can include two positive polarity tones at each lower edge of each of a plurality of 20 MHz sub-channels, and two negative polarity tones at each upper edge of each of the plurality of 20 MHz sub-channels. In various embodiments, the one or more edge tones can include two tones at each edge of each of a plurality of 20 MHz sub-channels, the one or more edge tones having values sufficient to minimize a peak-to-average power ratio during transmission of the second field.

DETAILED DESCRIPTION

Figure 1:
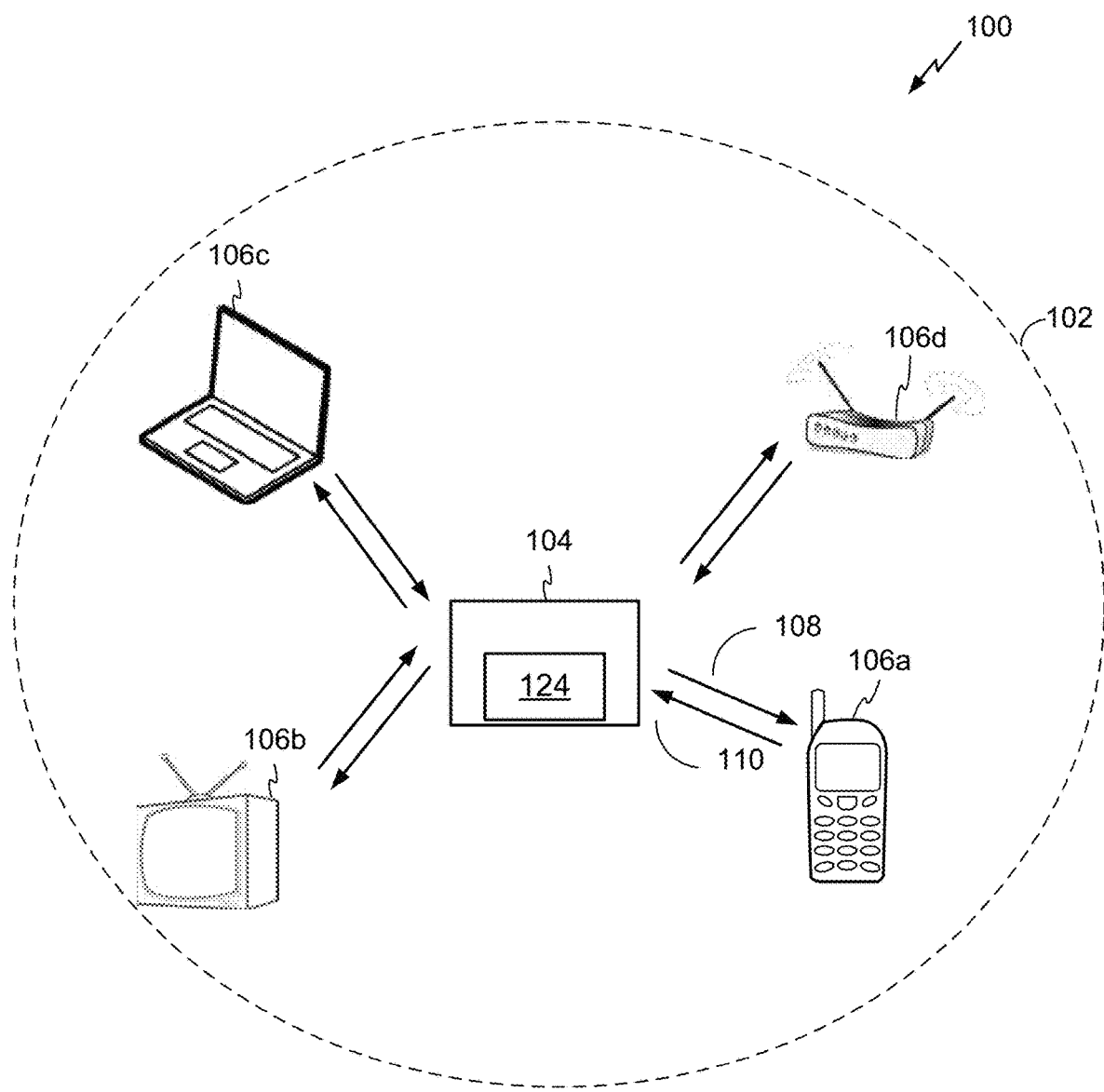
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the Institute of Electrical and Electronics Engineers (IEEE) 802.11 family of wireless protocols (e.g., 802.11a/b/g/n/ac/ah/ax, etc.).

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemes. Advantageously, aspects of certain devices implementing this particular wireless protocol can consume less power than devices implementing other wireless protocols, can be used to transmit wireless signals across short distances, and/or can be able to transmit signals less likely to be blocked by objects, such as humans.

In some implementations, a WLAN includes various devices which are the components that access the wireless network. For example, there can be two types of devices: access points ("APs") and clients (also referred to as stations, or "STAs"). In general, an AP serves as a hub or base station for the WLAN and an STA serves as a user of the WLAN. For example, a STA can be a laptop computer, a personal digital assistant (PDA), a mobile phone, etc. In an example, an STA connects to an AP via a Wi-Fi (e.g., IEEE 802.11 protocol such as 802.11ax) compliant wireless link to obtain general connectivity to the Internet or to other wide area networks. In some implementations an STA can also be used as an AP.

The techniques described herein can be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system can utilize sufficiently different directions to concurrently transmit data belonging to multiple user terminals. A TDMA system can allow multiple user terminals to share the same frequency channel by dividing the transmission signal into different time slots, each time slot being assigned to different user terminal. A TDMA system can implement Global System for Mobile communication (GSM) or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, frequency bands etc. With OFDM, each sub-carrier can be independently modulated with data. An OFDM system can implement IEEE 802.11 or some other standards known in the art. An SC-FDMA system can utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (e.g., implemented within or performed by) a variety of wired or wireless apparatuses (e.g., nodes). In some aspects, a wireless node implemented in accordance with the teachings herein can include an access point or an access terminal.

An access point ("AP") can include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also include, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed. The wireless communication system 100 can operate pursuant to a wireless standard, for example at least one of the 802.11ax, 802.11ac, 802.11n, 802.11g and 802.11b standards. The wireless communication system 100 can include an AP 104, which communicates with STAs 106a, 106b, 106c, and 106d (hereinafter collectively 106a-106d).

A variety of processes and methods can be used for transmissions in the wireless communication system 100 between the AP 104 and the STAs 106a-106d. For example, signals can be transmitted and received between the AP 104 and the STAs 106a-106d in accordance with OFDM/OFDMA techniques. If this is the case, the wireless communication system 100 can be referred to as an OFDM/OFDMA system. Alternatively, signals can be transmitted and received between the AP 104 and the STAs 106a-106d in accordance with code division multiple access (CDMA) techniques. If this is the case, the wireless communication system 100 can be referred to as a CDMA system. Alternatively, signals can be transmitted and received between the AP 104 and the STAs 106a-106d in accordance with multiple-user multiple-input multiple-output (MU-MIMO) techniques. If this is the case, the wireless communication system 100 can be referred to as a MU-MIMO system. Alternatively, signals can be transmitted and received between the AP 104 and the STAs 106a-106d in accordance with single-user multiple-input multiple-output (SU-MIMO) techniques. If this is the case, the wireless communication system 100 can be referred to as a SU-MIMO system. Alternatively, signals can be transmitted and received between the AP 104 and the STAs 106a-106d simultaneously in accordance with MU-MIMO techniques and OFDM/OFDMA. If this is the case, the wireless communication system 100 can be referred to as a multiple-technique system.

A communication link that facilitates transmission from the AP 104 to one or more of the STAs 106a-106d can be referred to as a downlink (DL) 108, and a communication link that facilitates transmission from one or more of the STAs 106a-106d to the AP 104 can be referred to as an uplink (UL) 110. Alternatively, a downlink 108 can be referred to as a forward link or a forward channel, and an uplink 110 can be referred to as a reverse link or a reverse channel.

The AP 104 can include a packet generator 124 which can be utilized to generate a packet including one or more features that enable a receiving device (e.g., the STAs 106a-106d) to determine the communication protocol associated with the packet after having received and processing as little of the preamble of the packet as possible, as will be described in more detail below. The AP 104 can provide wireless communication coverage in a basic service area (BSA) 102. The AP 104 along with the STAs 106a-106d associated with the AP 104, and that use the AP 104 for communication, can be referred to as a basic service set (BSS). It should be noted that the wireless communication system 100 may not have a central AP 104, but rather can function as a peer-to-peer network between the STAs 106a-106d. Accordingly, the functions of the AP 104 described herein can alternatively be performed by one or more of the STAs 106a-106d.

In some embodiments, the HEW STAs 106 can communicate using a symbol duration four times that of a legacy STA. Accordingly, each symbol which is transmitted can be four times as long in duration. When using a longer symbol duration, each of the individual tones may only require one-quarter as much bandwidth to be transmitted. For example, in various embodiments, a 1× symbol duration can be 4 µs and a 4× symbol duration can be 16 µs. Thus, in various embodiments, 1× symbols can be referred to herein as legacy symbols and 4× symbols can be referred to as HEW symbols. In other embodiments, different durations are possible.

Figure 2:
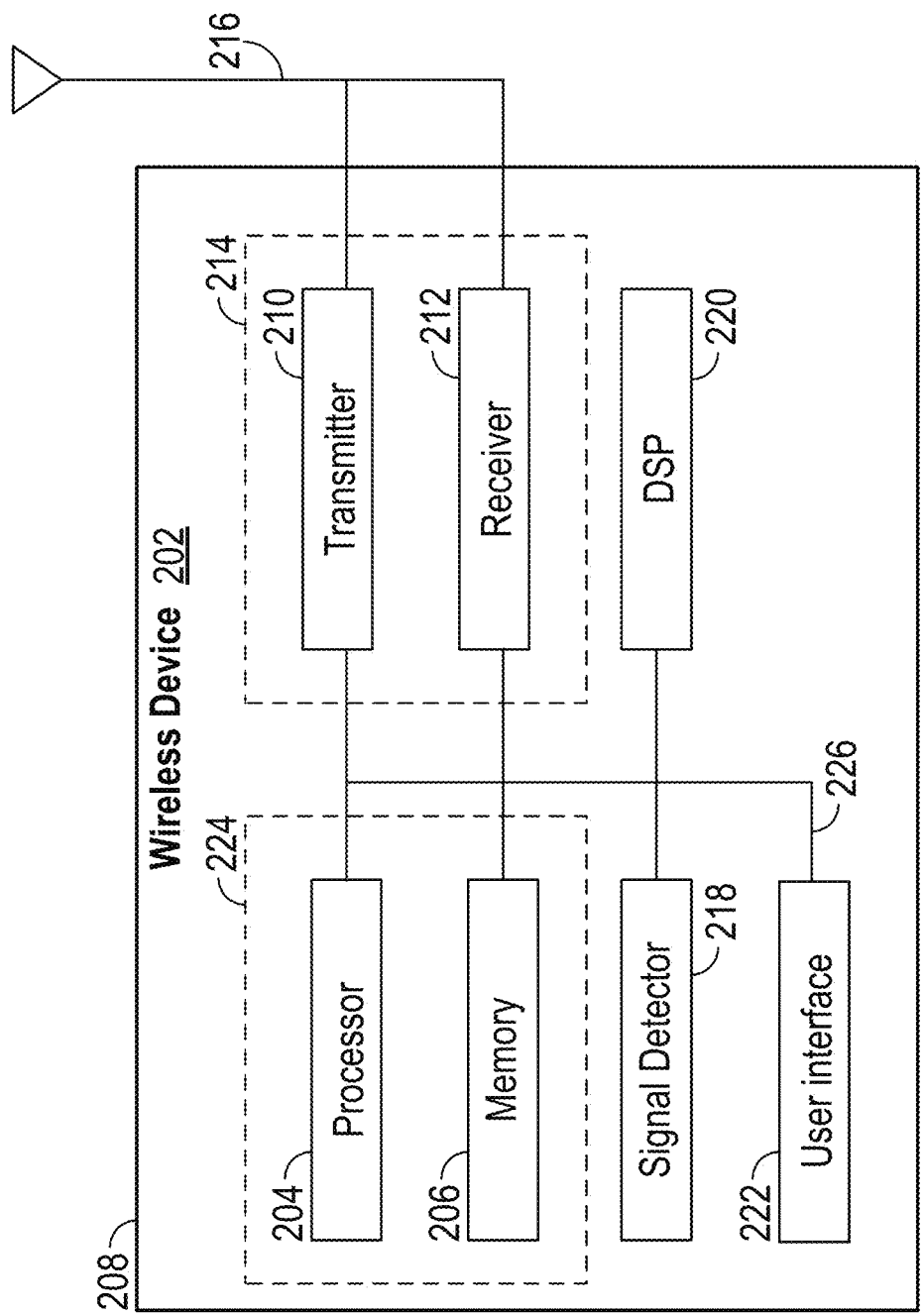
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can include the AP 104 or one of the STAs 106a-106d.

The wireless device 202 can include a processor 204 which controls operation of the wireless device 202. The processor 204 can also be referred to as a central processing unit (CPU) or hardware processor. Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. Where the wireless device 202 corresponds to the AP 104 of FIG. 1, the processor 204 or the processor 204 and the memory 206 can correspond to the packet generator 124.

The processing system can also include non-transitory machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include multiple transmitters, multiple receivers, multiple transceivers, and/or multiple antennas, (not shown) which can be utilized during multiple-input multiple-output (MIMO) communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can include a physical layer data unit (PPDU). In some aspects, the PPDU is referred to as a packet.

The wireless device 202 can further include a user interface 222 in some aspects. The user interface 222 can include a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can include an AP 104 or one of the STAs 106a-106d, and can be used to transmit and/or receive communications. The communications exchanged between devices in a wireless network can include data units which can include packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

The 802.11 family of wireless communications protocols includes several different protocols (e.g., 802.11a, 802.11b, 802.11g, 802.11n, 802.11ac, and 802.11ax for example). To ensure compatibility between different WiFi standards, receiving devices distinguish between PPDUs from one wireless communication protocol and PPDUs from another wireless communication protocol utilizing information embedded within a preamble of each of the PPDUs. Below, FIGS. 3-6 describe exemplary preambles for several of the 802.11 family of wireless protocols in more detail.

Figure 3:
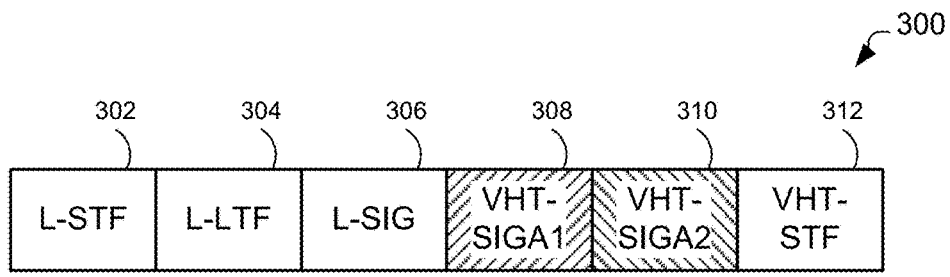
FIG. 3 illustrates a diagram of a preamble of a physical layer data unit (PPDU) packet encoded according to the 802.11ac wireless communication protocol.

FIG. 3 illustrates a diagram of a preamble 300 of a physical layer data unit (PPDU) packet encoded according to the 802.11ac wireless communication protocol. The preamble 300 can include a legacy short training field (e.g., L-STF field 302), a legacy long training field (e.g., L-LTF field 304), and a legacy signal field (e.g., L-SIG field 306). Each of the fields 302, 304 and 306 are termed "legacy" because these fields are backwards compatible with earlier legacy 802.11 communication protocols (e.g., 802.11a/b/g) such that wireless communication devices operating according to these legacy protocols can also decode these legacy preamble fields. Accordingly, in certain mixed-standard environments, all devices (or a first set) can decode legacy fields, whereas only a subset of devices (or a subset of the first set, e.g., HE devices) can decode HE fields. The 802.11ac PPDU preamble 300 can also include a first very high throughput signal symbol (VHT-SIGA1) 308, which can be encoded utilizing binary phase shift keying (BPSK). The 802.11ac PPDU preamble 300 can also include a second very high throughput signal symbol (VHT-SIGA2) 310, which can be encoded utilizing 90° rotated BPSK (quadrature BPSK or Q-BPSK). Although illustrated separately for ease of visualization, the VHT-SIGA1 308 and VHT-SIGA1 308 symbols together include a 2-symbol VHT signal field. The 802.11ac PPDU preamble 300 can also include a VHT short training field (VHT-STF) 312. The symbols 308 and 310 and the field 312 can be decodable by wireless communication devices operating according to the 802.11ac protocol, but not by wireless communication devices operating according to, for example, 802.11a/b/g protocols.

Figure 4:
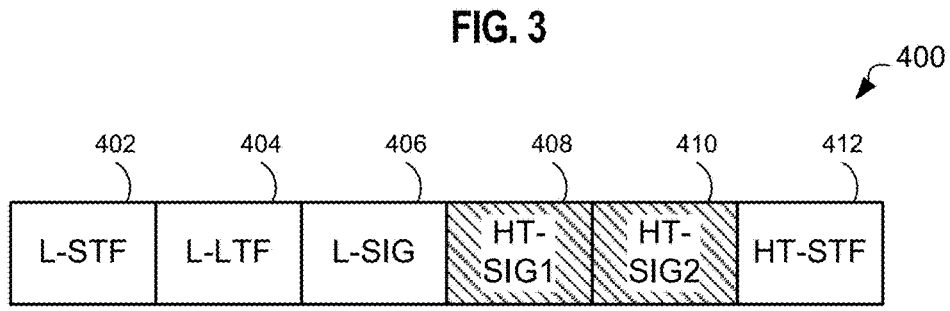
FIG. 4 illustrates a diagram of a preamble of a physical layer data unit (PPDU) packet encoded according to the 802.11n wireless communication protocol.

FIG. 4 illustrates a diagram of a preamble 400 of a physical layer data unit (PPDU) packet encoded according to the 802.11n wireless communication protocol. The 802.11n preamble 400 can include an L-STF field 402, a L-LTF field 404 and a L-SIG field 406, which can each correspond to and be substantially identical to the L-STF field 302, the L-LTF field 304 and the L-SIG field 306 of FIG. 3, respectively. The 802.11n preamble 400 can additionally include a first high throughput signal symbol (HT-SIG1) 408, which can be encoded utilizing Q-BPSK. The 802.11n preamble 400 can additionally include a second high throughput signal symbol (HT-SIG2) 410, which can also be encoded utilizing Q-BPSK. As with FIG. 3, although illustrated separately for ease of visualization, the HT-SIG1 408 and HT-SIG2 410 symbols together include a 2-symbol HT signal field. The 802.11n PPDU preamble 400 can also include a HT short training field (HT-STF) 412. The symbols 408 and 410 and the field 412 can be decodable by wireless communication devices operating according to the 802.11n protocol, but not by wireless communication devices operating according to, for example, 802.11a/b/g protocols.

With respect to distinguishing between an 802.11ac-encoded PPDU and an 802.11n-encoded PPDU, a receiving wireless communication device can simply perform a Q-BPSK check on the first and second high throughput signal symbols in the preamble of the received PPDU. For example, since both the HT-SIG1 symbol 408 and the HT-SIG2 symbol 410 are both encoded utilizing Q-BPSK, while only the VHT-SIGA2 symbol 310 and not the VHT-SIGA1 symbol 308 is encoded utilizing Q-BKSK, if a Q-BPSK check is performed on the preamble of the received PPDU, the receiving device can be able to differentiate between an 802.11ac PPDU and an 802.11n PPDU.

Figure 5:
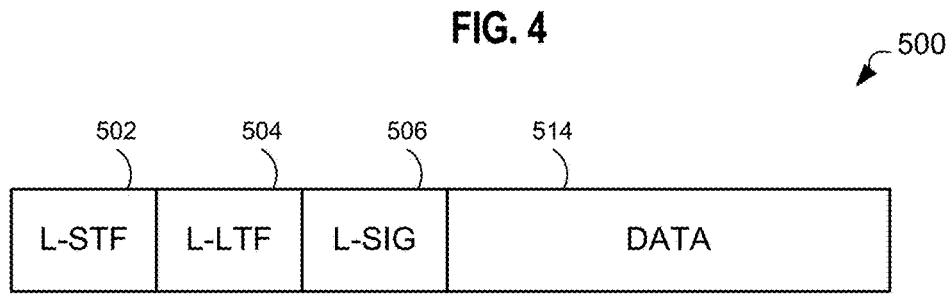
FIG. 5 illustrates a diagram of a preamble of a physical layer data unit (PPDU) packet encoded according to the 802.11a wireless communication protocol.

FIG. 5 illustrates a diagram of a preamble 500 of a physical layer data unit (PPDU) packet encoded according to the 802.11a wireless communication protocol. The 802.11a preamble 400 can include an L-STF field 502, a L-LTF field 504 and a L-SIG field 506, which can each correspond to and be substantially identical to the L-STF field 302, the L-LTF field 304 and the L-SIG field 306 of FIG. 3, respectively. Although shown, data field 514 is not a part of the preamble 500 but is included to show transition to the data portion of the PPDU. Data fields would similarly follow the last field of each of the preambles shown in FIGS. 3, 4, and 6. The preamble 500 does not include any high throughput fields because the 802.11a protocol is a legacy protocol that is not configured for high or very high throughput communication as are the 802.11ac and 802.11n protocols.

Figure 6:
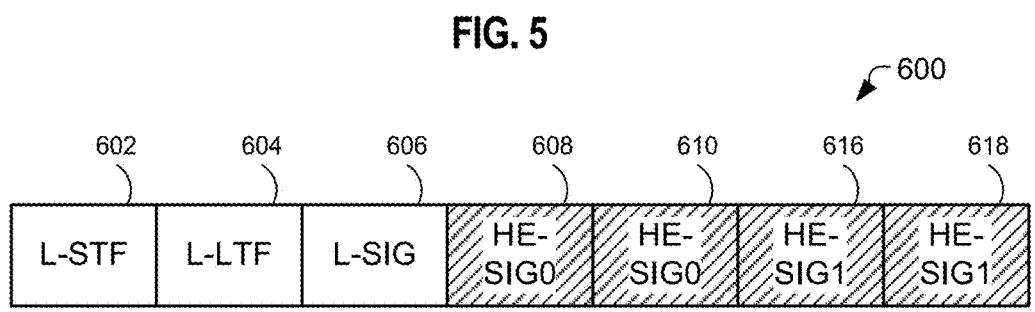
FIG. 6 illustrates a diagram of a high efficiency wireless (HEW) preamble of a physical layer data unit (PPDU) packet, in accordance with an exemplary implementation.

FIG. 6 illustrates a diagram of a high efficiency wireless (HEW) preamble 600 of a physical layer data unit (PPDU) packet, in accordance with an exemplary implementation. The preamble 600 can include an L-STF field 602, a L-LTF field 604 and a L-SIG field 606, which can each correspond to and be substantially identical to the L-STF field 302, the L-LTF field 304 and the L-SIG field 306 of FIG. 3, respectively. The preamble 600 can additionally include a first high efficiency signal symbol (HE-SIG0) 608, a second high efficiency signal symbol HE-SIG0 610, a third high efficiency signal symbol (HE-SIG1) 616, and a fourth high efficiency signal symbol (HE-SIG1) 618. Although shown separately, the first and second HE-SIG0 symbols 608 and 610 can form a first HE-SIG0 field, while the third and fourth HE-SIG1 symbols 616 and 618 can form a second HE-SIG1 field. Each of the first and second HE-SIG0 symbols 608 and 610 and the third and fourth HE-SIG1 symbols 616 and 618 can be encoded utilizing BPSK.

In some implementations, symbols after the HE-SIG0 symbol 610 (e.g., the HE-SIG1 symbols 616 and 618 and following signals) can have either short or long guard intervals spaced between each symbol in order to balance high throughput with low error rates in varying environmental conditions while conserving OFDM orthogonality in long-delay-spread environments. An indication of whether short or long guard intervals are utilized can be based on a value of a signaling bit located within one or both of the HE-SIG0 symbols 608 and 610. Because symbols after the HE-SIG0 symbol 610 will utilize guard intervals having one of two different lengths, it is desirable for a receiving device to be able to determine that the received PPDU has been encoded according to the HEW mode (e.g., is a HEW preamble) by the end of receiving and/or processing the first HE-SIG0 symbol 608 in order to give the receiving device enough time to adjust buffering and segmentation based on the guard interval between symbols after the HE-SIG0 610 symbol. If the receiving wireless communication device detects the HEW mode later than the first HE-SIG0 symbol 608, it becomes difficult or impossible for the device hardware or software to make such required adjustments to correctly parse the remainder of the PPDU without losing or incorrectly parsing data.

In various embodiments, HE-SIG1 field can have a variable length. The length of an HE-SIG1 field can be indicated by any field in earlier SIG symbols, such as the L-SIG 606, the HE-SIG0 608, and/or the HE-SIG0 610. In some embodiments, the length of an HE-SIG1 field can be encoded in a polarity of pilot tones (for example, positive or reversed), thereby saving several bits in earlier SIG symbols. For example, normal symbols can include pilot tones having polarities that change in a deterministic pattern. In an embodiment, the last HE-SIG1 symbol 618 can include pilots having negated polarity as compared to prior HE-SIG1 symbols 616. Accordingly, the negated pilot tones can indicate that the HE-SIG1 symbol 618 is the last HE-SIG1 symbol. In an embodiment, the last HE-SIG1 symbol can include pilot tones having negated polarity as compared to one or more prior symbols.

Figure 7:
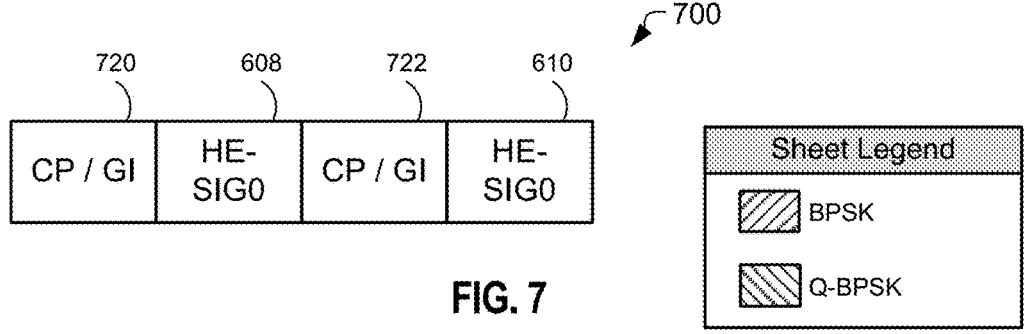
FIG. 7 illustrates a more detailed diagram of the first and second HE-SIG0 symbols of the HEW preamble shown in FIG. 6.

FIG. 7 illustrates a more detailed diagram 700 of the first and second HE-SIG0 symbols 608/610 of the HEW preamble 600 shown in FIG. 6. Each of the HE-SIG0 symbols 608 and 610 can be separated from adjacent symbols by a cyclic prefix (CP) also known as a guard interval (GI). For example, the first HE-SIG0 symbol 608 has an associated CP or GI 720 and the second HE-SIG0 symbol 610 has an associated CP or GI 722. In some implementations, the CPs 720 and 722 can have a duration of 0.8 µs while each of the HE-SIG0 symbols 608 and 610 can have a duration of 3.2 µs. Thus, each HE-SIG0 symbol 608/610 inclusive of the associated CP 720/722 can have a total duration of 4 µs. Thus, the GIs 720/722 provide a temporal spacing between adjacent symbols in the PPDU to ensure that a receiving wireless communication device can reliably decode a received PPDU even when environmental perturbations, such as delays due to multipath reflection, etc., cause a long delay spread of the received PPDU. In addition to the temporal spacing provided by the GIs 720/722, the channel on which each PPDU is transmitted can include a number of edge tones adjacent to data carrying non-edge or non-guard data tones, or subcarriers, which provide a spectral (e.g., frequency) buffer or spacing between adjacent communication channels. Conventionally, such edge tones are designed to have a zero energy content, e.g., transmitting wireless communication devices are not configured to transmit any signals or energy in the edge tones and receiving wireless communication devices are not configured to read signals or decode any energy in the edge tones. However, the present application contemplates utilizing such edge tones for signaling that a particular PPDU is being transmitted or formatted according to a HEW mode or protocol. Thus, by detecting and/or decoding a non-zero energy level in the edge tones or one or more fields or symbols within a field of the PPDU preamble, a receiving wireless communication device can be configured to determine that the PPDU is a HEW mode or protocol PPDU.

Referring back to FIG. 6, in some embodiments, the two-symbol HE-SIG0 field, including HE-SIG0A 608 and HE-SIG0B 610, can present a bottleneck during demodulation of the preamble 600. In some embodiments, a one-symbol HE-SIG0 field can be used. In various embodiments, a one-symbol HE-SIG0 field can provide a relatively lower packet error rate (PER), as compared to a two-symbol HE-SIG0 field, at relatively higher signal-to-noise ratios (SNRs).

Figure 8:
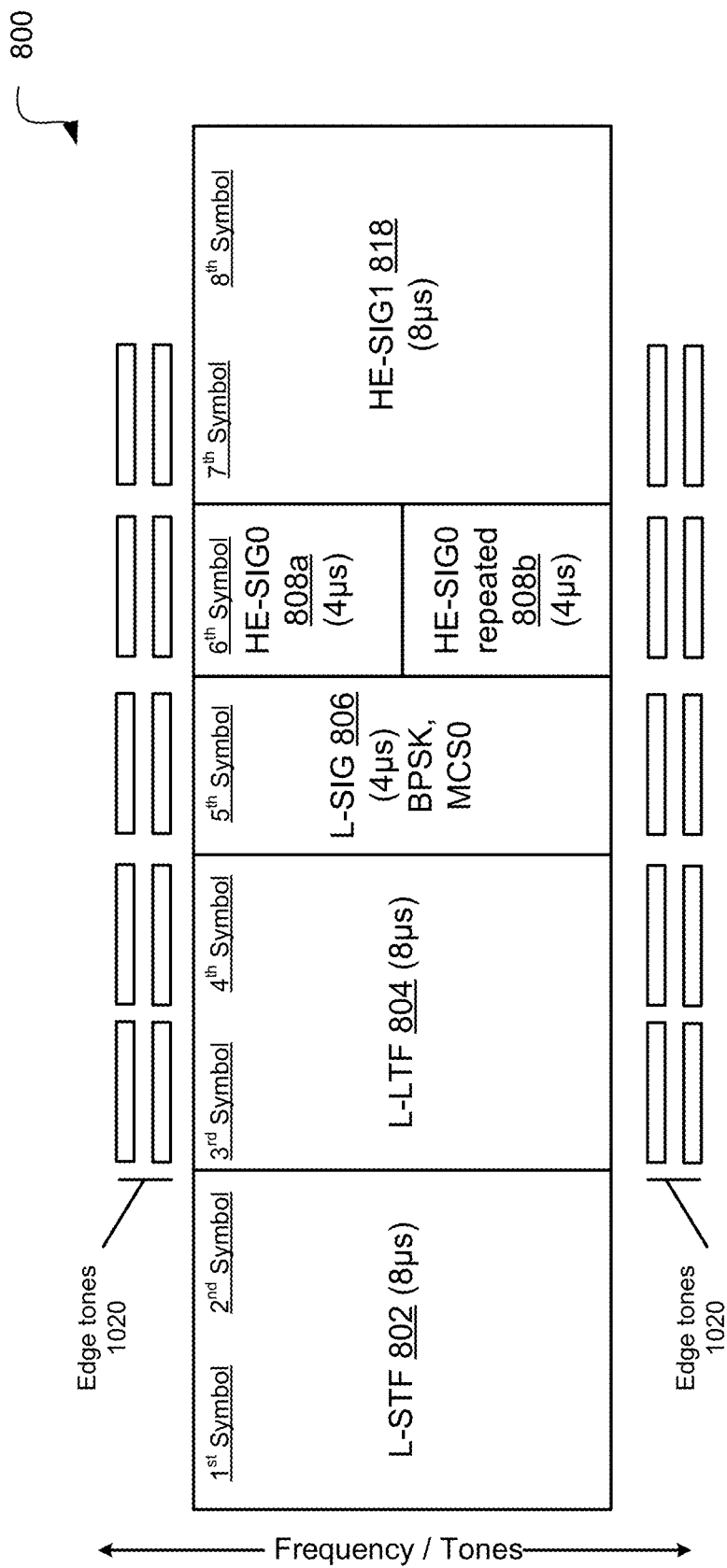
FIG. 8 illustrates a diagram of a high efficiency wireless (HEW) preamble of a physical layer data unit (PPDU) packet, in accordance with another exemplary implementation.

FIG. 8 illustrates a diagram of a high efficiency wireless (HEW) preamble 800 of a physical layer data unit (PPDU) packet, in accordance with another exemplary implementation. In some implementations, the HEW preamble 800 can correspond to the preamble 600 shown in FIG. 6, but with a one-symbol HE-SIG0 808 in contrast to the two-symbol HE-SIG0 608 and 610 of FIG. 6. In an embodiment, the HE-SIG0 808 is a single 1× symbol.

The HEW preamble 800 can include a L-STF field 802, a L-LTF field 804 and a L-SIG field 806, which can correspond to the L-STF field 602, L-LTF field 604 and L-SIG field 606 of FIG. 6, respectively. As previously described, in some implementations, each symbol with an associated guard interval can have a combined duration of 4 µs. Thus, the L-STF 802 can include two temporally adjacent symbols. Likewise, in some implementations, the L-LTF 804 can include two temporally adjacent symbols and the L-SIG field 806 can include one symbol. Accordingly, as shown, the L-STF 802 can include a first and second symbol of the preamble 800, the L-LTF 804 can include a third and fourth symbol of the preamble 800, the L-SIG 806 can include a fifth symbol of the preamble 800, the HE-SIG0 808a/808b can include a sixth symbol of the preamble 800, and the HE-SIG1 can include a seventh and eighth symbol of the preamble 800.

In addition, in some implementations, frequency repetition can be utilized on the HE-SIG0 symbol 808a-808b to indicate that the PPDU is a HEW PPDU. In such implementations, within a particular symbol, a first group of tones (e.g., the tones within the HE-SIG0 808a) can include an identical copy of information in a second group of tones (e.g., the tones within the HE-SIG0 808b). In some implementations, the information can be encoded utilizing BPSK. For example, as previously described, for each 20 MHz bandwidth, where a PPDU includes fields having symbols with 52 non-guard tones, the HE-SIG0 808a symbol can include 26 spectrally adjacent tones and the HE-SIG0 808b symbol can include the 26 other spectrally adjacent tones.

The information contained in the 26 tones of HE-SIG0 808a can be repeated in the 26 tones of HE-SIG0 808b. In some other implementations, instead of repeating an entire block of spectrally adjacent and consecutive tones, the repetition can be carried out in every other tone. For example, the $2^{nd}$ tone can repeat the information in the $1^{st}$ tone, the $4^{th}$ tone can repeat the information in the $3^{rd}$ tone, etc. Such an option can provide good channel coherence between adjacent channels, which can make HEW detection more reliable.

In some embodiments, the repeated HE-SIG0 808b can include interleaved tones of the HE-SIG0 808a. Interleaved repetition can provide frequency diversity in fading channels. In general, in various embodiments, a jth tone of a first HE-SIG0 field (for example, the HE-SIG0 808b) can repeat an ith tone of a second HE-SIG0 (for example, the HE-SIG0 808a), where j≠i.

In addition, in some implementations, an indication as to whether the guard interval associated with each symbol after the HE-SIG0 field is a short guard interval or a long guard interval can be encoded in the non-zero signal energies of the edge tones as described above. For example, by utilizing anti-podal coding on spectrally adjacent edge tones (e.g., populating edge tones adjacent to one another in the same symbol with opposite non-zero signal polarities (−1,1 or 1,−1)), a transmitting wireless communication device can code for one of the short guard interval and the long guard interval. Contrarily, where the non-zero signal energies of the spectrally adjacent edge tones are not anti-podally coded (e.g., the spectrally adjacent edge tones have the same non-zero signal energies (1,1 or −1,−1)), the transmitting wireless communication device can code for the other of the short guard interval and the long guard interval.

Thus, a transmitting wireless communication device can populate a PPDU with the preamble 800 as described above to indicate the PPDU is a HEW PPDU, and a receiving wireless communication device can be configured to sense the edge tones having non-zero signal energy in at least one of the symbols in the L-LTF 804 field, the L-SIG 806 field, or the HE-SIG0 808 field and be able to extract an indication of the guard interval length in addition to the indication that the PPDU is a HEW PPDU from the non-zero energy populated edge tones.

Figure 9A:
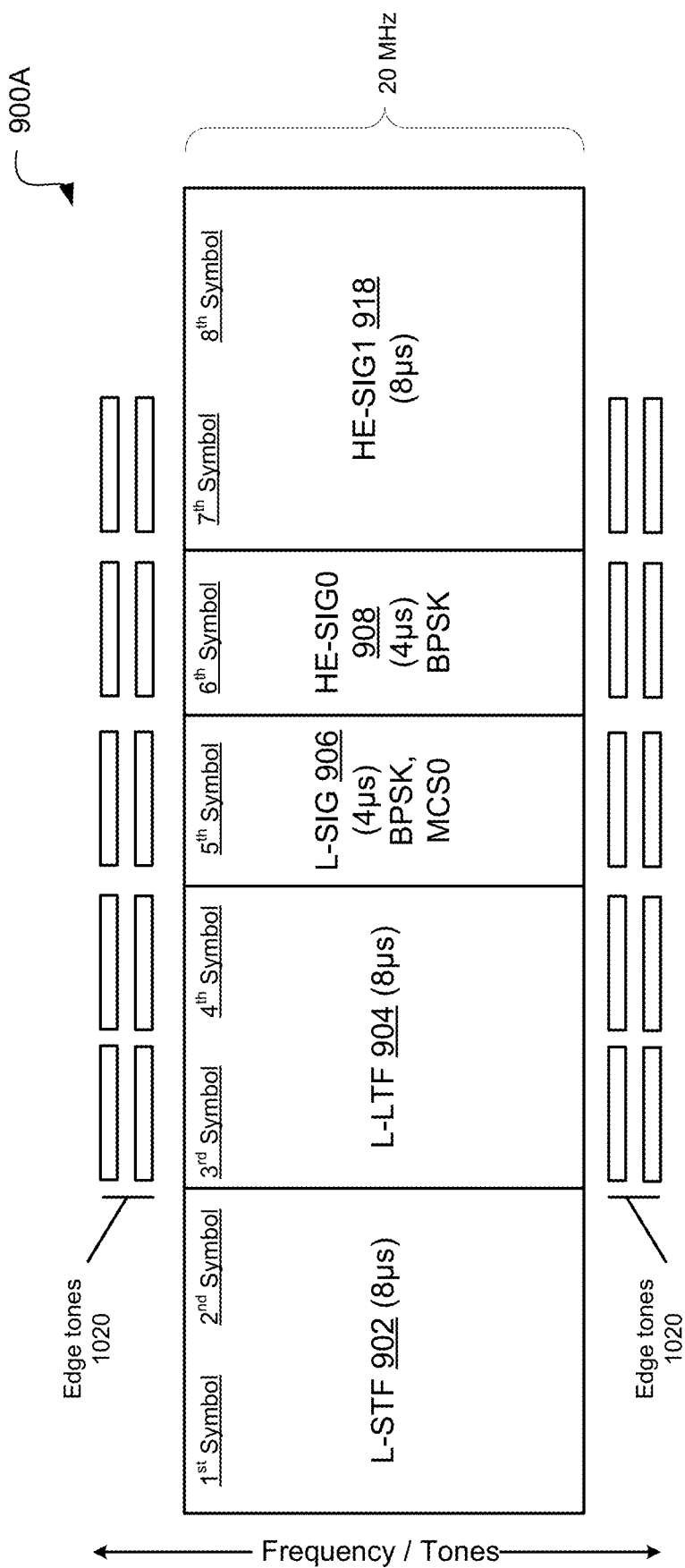
FIG. 9A illustrates a diagram of a high efficiency wireless (HEW) preamble of a physical layer data unit (PPDU) packet, in accordance with another exemplary implementation.

FIG. 9A illustrates a diagram of a high efficiency wireless (HEW) preamble 900A of a physical layer data unit (PPDU) packet, in accordance with another exemplary implementation. Preamble 900A can include fields and symbols that correspond to each of the fields and symbols as described above in connection with FIG. 8 with the exception that the HE-SIG0 symbol 908 does not incorporate frequency repetition. In addition, non-zero energy edge tone population can be carried out as described above in connection with FIG. 8. However, instead of utilizing frequency repetition, some implementations according to FIG. 9A further include non-zero signal energies on only the even numbered non-guard tones, while the odd numbered non-guard tones can have zero signal energy. For example, where 52 spectrally adjacent and consecutive non-guard tones are utilized, the $2^{nd}$, $4^{th}$, $6^{th}$ ... $48^{th}$, $50^{th}$ and $52^{nd}$ non-guard tones can have non-zero signal energy while the $1^{st}$, $3^{rd}$, $5^{th}$ ... $49^{th}$ and $51^{st}$ non-guard tones can have substantially zero signal energy. In some implementations, 4 of the odd tones can also be reserved for and populated with pilot tones where the remainder of the odd tones have substantially zero signal energy. Thus, in some implementations according to FIG. 9A, the transmitting wireless communication device can populate the edge tones as described above in connection with FIG. 8 and can additionally populate the even non-guard tones of the HE-SIG0 symbol 908. A receiving wireless communication device can detect the HEW PPDU by correlating the received preamble symbols according to a periodicity of the symbols (e.g., 1.6 µs which is half of the data-carrying 3.2 µs interval of the symbols as previously described). This has the benefit of long guard intervals (e.g., 0.8 µs between symbols as previously described). The receiving wireless communications device can alternatively or additionally detect the HEW PPDU by measuring the even vs. odd tones total energy content. Utilizing only the even non-guard tone populating without edge tone populating, the signal to noise requirements for reliable HEW PPDU detection can include reading HE-SIG0 908 symbol. However, by combining the even non-guard tone populating with the edge tone populating the signal to noise requirements for reliable HEW PPDU detection can be easily met after reading only the HE-SIG0 symbol 908.

Figure 9B:
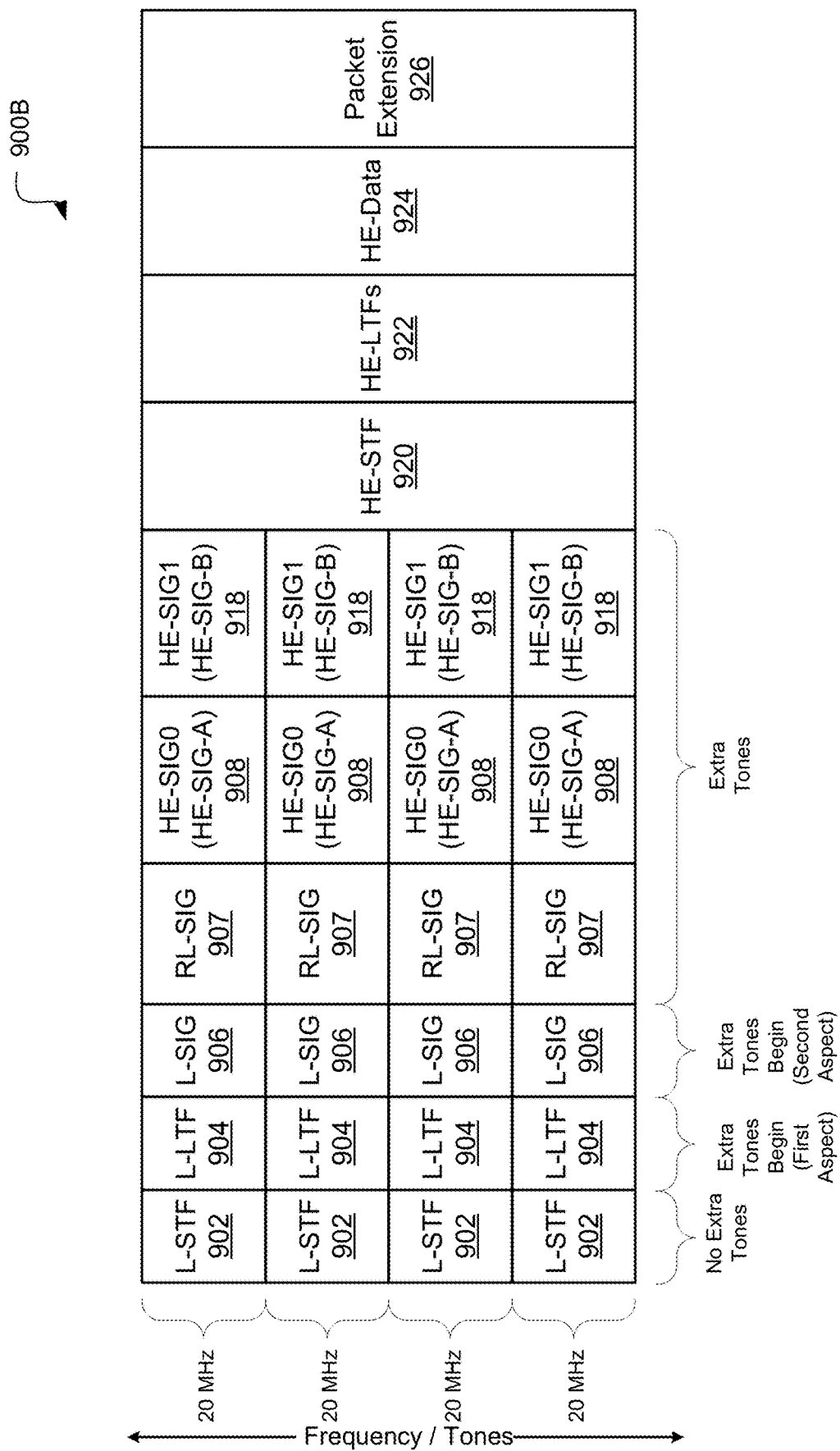
FIG. 9B illustrates a diagram of a high efficiency wireless (HEW) physical layer data unit (PPDU) packet, in accordance with another exemplary implementation.

FIG. 9B illustrates a diagram of a high efficiency wireless (HEW) physical layer data unit (PPDU) packet 900B, in accordance with another exemplary implementation. Packet 900B can include fields and symbols that correspond to each of the fields and symbols as described above in connection with FIG. 9A with the exception that the L-SIG 906 is repeated in time as a repeated L-SIG (RL-SIG) 907. The packet 900B further shows each 20 MHz portion of the preamble 900A separately encoded over an 80 MHz bandwidth. The packet 900B further includes an HE-STF 920 (which can be encoded ever the entire 80 MHz bandwidth), one or more HE-LTFs 922 (which can be encoded ever the entire 80 MHz bandwidth), HE-Data 924 (which can be encoded ever the entire 80 MHz bandwidth), and a packet extension 926 (which can be encoded ever the entire 80 MHz bandwidth). As with the preamble 900A of FIG. 9A, non-zero energy edge tone population can be employed on one or more "extra tones," as described further in the section titled "Use of Edge Tones to Carry Data."

Figure 10:
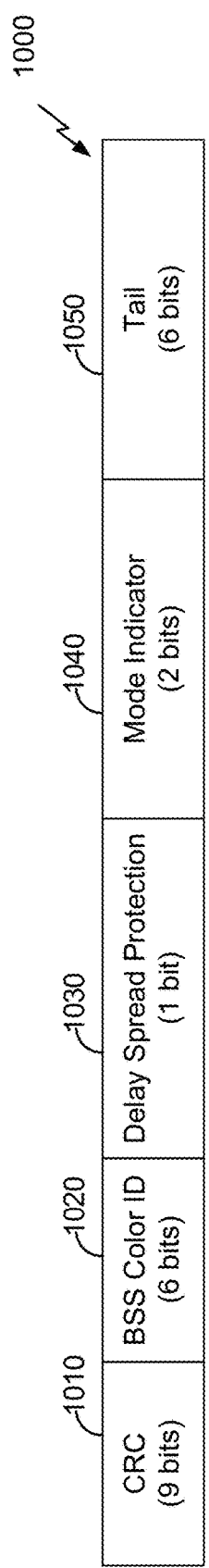
FIG. 10 shows an example high-efficiency (HE) signal (SIG) field, according to various embodiments.

FIG. 10 shows an example high-efficiency (HE) signal (SIG) field 1000, according to various embodiments. The HE-SIG field 1000 can correspond to, for example, any of the HE-SIG0 fields 808a-808b and 908, discussed above with respect to FIGS. 8-9, or any other field discussed herein. Although various fields, bit positions, and sizes are shown, a person having ordinary skill in the art will appreciate that the HE-SIG field 1000 can include additional fields, fields can be rearranged, removed, and/or resized, and the contents of the fields varied.

In the illustrated embodiment the HE-SIG field 1000 includes a cyclic redundancy check (CRC) for mode classification 1010, a basic service set (BSS) color identification 1020, a delay spread protection field 1030, a mode indicator 1040, and a tail 1050. As shown, the HE-SIG field 1000 has a 24-bit payload. In various other embodiments, the HE-SIG field 1000 can be another size. For example, the HE-SIG field 1000 can be 26 bits long, such as in embodiments where the L-LTF/L-SIG/HE-SIG1 includes 56 tones. In various embodiments, the HE-SIG field 1000 can include one or more bits to indicate a modulation and coding scheme (MCS) of a following HE-SIG field (such as the HE-SIG1 field 818 or 918 of FIGS. 8-9).

The CRC 1010 serves to indicate that the HE-SIG field 1000 is included in a HE packet. The CRC 1010 can be generated from the remaining HE-SIG fields 1020-1050, from both an L-SIG field (such as the L-SIG 806 or 906 of FIGS. 8-9) and the remaining HE-SIG fields 1020-1050, or from another data set. In embodiments where the CRC 1010 is at least partially generated from the L-SIG field, the CRC 1010 can be used to validate the L-SIG.

In the illustrated embodiment, the CRC 1010 is 9 bits long. In some embodiments, the CRC 1010 can be sized such that the odds of a false alarm are less than 1%, less than 0.1%, or less than another threshold. In various embodiments, the CRC 1010 can be between 7 and 11 bits long, between 4 and 16 bits long, or a variable length.

The BSS color ID 1020 serves to indicate an associated basic service set or subset thereof. In the illustrated embodiment, the BSS color ID 1020 is 6 bits long. In various embodiments, the BSS color ID 1020 can be 5 bits long, between 4 and 8 bits long, or a variable length.

The delay spread protection field 1030 serves to indicate a delay spread protection mode for a HE-SIG1 field (such as the HE-SIG1 818 or 918 of FIGS. 8-9). In an embodiment, the delay spread protection field 1030 can be a 1-bit flag. When the delay spread protection field 1030 is set, the HE-SIG1 field is sent with a repetition in time. When the delay spread protection field 1030 is unset, the HE-SIG1 field is sent with a larger cyclic prefix (CP). In other embodiments, the delay spread protection field 1030 can indicate additional delay spread protection modes. In various embodiments, the delay spread protection field 1030 can be between 1 and 2 bits long, between 1 and 4 bits long, or a variable length.

The mode indicator 1040 serves to indicate a packet transmission mode. For example, the mode indicator 1040 can indicate whether the packet is a downlink (DL) or uplink (UL) packet, and whether the packet is a single-user (SU) or multi-user (MU) packet, and in particular whether the packet is a UL MU OFDMA packet. In some embodiments, the mode indicator 1040 can indicate whether an HE-SIG1 field is present or skipped, or a position of an HE-STF within the packet. For example, in embodiments where the transmission mode is UL MU OFDMA, the HE-SIG1 field can be skipped and the HE-STF can immediately follow the HE-SIG0 field.

In the illustrated embodiment, the mode indicator 1040 is 2 bits long. A value of 0b00 indicates a DL mode, a value of 0b01 indicates a UL SU mode, a value of 0b10 indicates a UL MU and OFDMA mode, and the value of 0b11 is reserved. In various embodiments, other values can be used. In various embodiments, the mode indicator 1040 can be between 1 and 4 bits long, between 1 and 4 bits long, or a variable length.

The tail 1050 can serve to allow processing of the HE-SIG field 1000 to complete. For example, the tail 1050 can allow a convolutional code to complete. In various embodiments, the tail 1050 can be set to all zeros. In the illustrated embodiment, the tail 1050 is 6 bits long. In various embodiments, the tail 1050 can be between 4 and 8 bits long, between 2 and 10 bits long, or a variable length.

Figure 11:
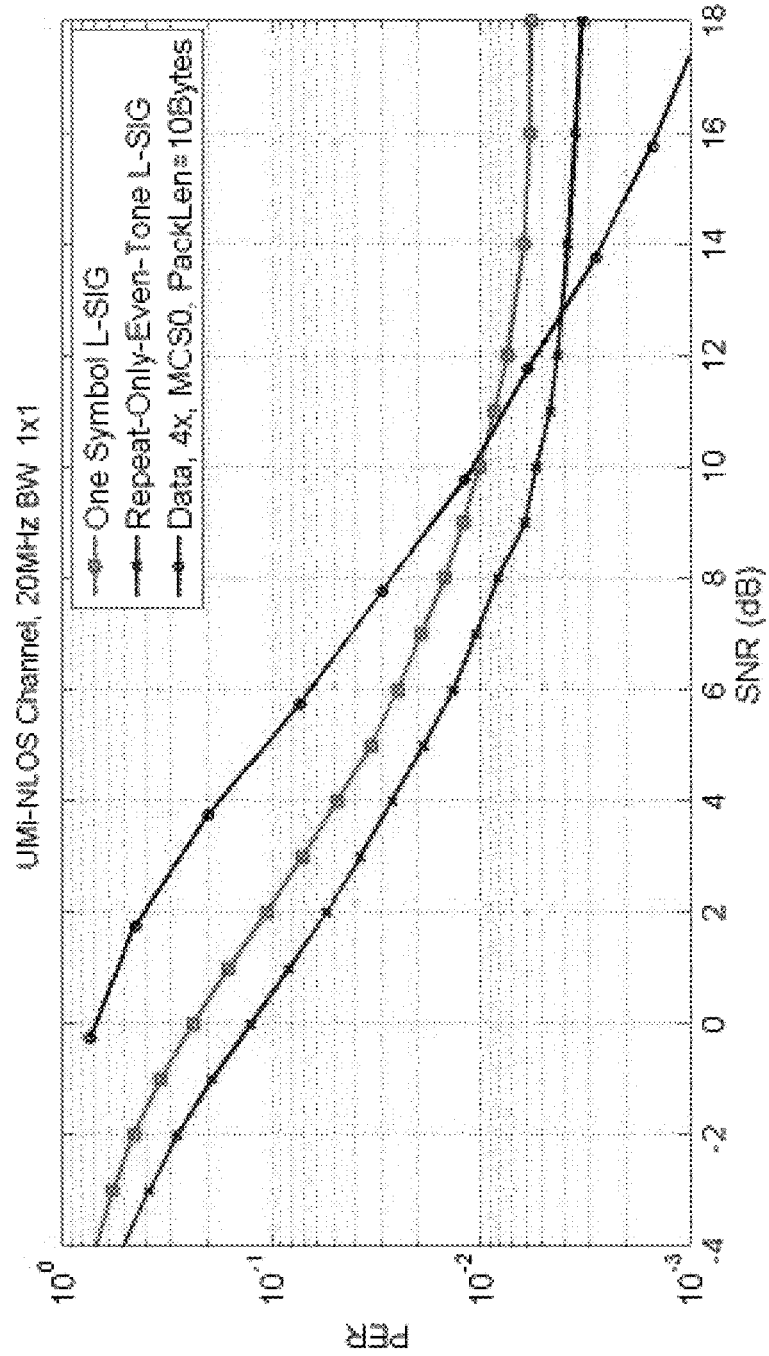
FIG. 11 is a graph showing example packet error rates (PERs) as a function of signal-to-noise ratio (SNR) in various embodiments.

FIG. 11 is a graph showing example packet error rates (PERs) as a function of signal-to-noise ratio (SNR) in various embodiments. As shown in FIG. 11, the x-axis represents an SNR of a wireless environment, and the y-axis shows an associated PER for an example 20 MHz channel. Results are shown for embodiments of: one symbol L-SIG, L-SIG having even tone repetition, and a 10-byte packet using MSC0 and having a 4× symbol duration. In the illustrated example, the one-symbol L-SIG embodiment has a lower PER than the data embodiment for SNR greater than around 10 dB.

Use of Edge Tones to Carry Data

As discussed above, the present application contemplates utilizing edge tones (for example, the edge tones between each 20 MHz section shown in FIG. 9B) for signaling data. In various embodiments, edge tones can be used for signaling data beginning on L-LTF symbols (for example, the L-LTF 904 of FIG. 9B). In other embodiments, edge tones can be used for signaling data beginning on L-SIG symbols (for example, the L-SIG 906 of FIG. 9B). Accordingly, in some embodiments, each 20 MHz transmission can use 52 data tones (plus 4 null edge tones) for one or more early fields, and 56 data tones (including 4 edge tones carrying data) for one or more later fields. In various embodiments, edge tones carrying data can be referred to as "extra tones."

In embodiments where edge tones are used for signaling data beginning on L-LTF symbols, the edge tones carrying data can be used for mode detection purposes as discussed herein (for example, with respect to FIG. 10). Thus, polarity on the extra tones can be used to carry 1 bit of information. In other embodiments, the extra tones can be used for channel estimation purposes.

In various embodiments, the extra tones can allow use of a HT-LTF sequence for 20 MHz instead of an L-LTF sequence. For example, the extra tones can include at least a portion of a HT-LTF sequence which, in combination with the original L-LTF sequence, can form an HT-LTF.

In embodiments where extra tones are used for channel estimation, a plurality of channel estimation patterns can be employed. Selection of a particular channel estimation pattern can further carry additional data. For example, extra tone polarity of [1 −1 1 −1] could indicate a 0b0, and extra tone polarity of [−1 1 −1 1] could indicate 0b1, and so on. Thus, an extra 4 edge tones on an L-SIG field can be used to carry two extra bits of data. In some embodiments, such data can be jointly encoded with HE-SIG0 to preserve integrity of L-SIG encoding.

In embodiments where edge tones are used for signaling data beginning on L-SIG symbols, the edge tones carrying data can be used for channel estimation. As discussed herein, a plurality of channel estimation patterns can be employed. Selection of a particular channel estimation pattern can further carry additional data. For example, extra tone polarity of [1 −1 1 −1] could indicate a 0b0, and extra tone polarity of [−1 1 −1 1] could indicate 0b1, and so on. In various embodiments, predetermined bits on the extra tones providing channel estimation can be used for carrying information on HE-SIG0/1.

In one embodiment where edge tones are used for signaling data beginning on L-SIG symbols, 4 extra tones can be employed, with 2 extra tones on each edge of each 20 MHz sub-channel. The extra tones can be applied for transmission of the L-SIG, RL-SIG, HE-SIG-A, and HE-SIG-B fields (for example, one or more of: the L-SIG field 906, the RL-SIG field 907, the HE-SIG-A field 908, and the HE-SIG-B 918 of FIG. 9B). Accordingly, in some embodiments, the number of data subcarriers ($N_{SD}$) in HE-SIG-A and HE-SIG-B fields can be increased by 4 in each 20 MHz sub-channel. Moreover, the transmitter can maintain the same total power, over L-SIG, RL-SIG, HE-SIG-A and HE-SIG-B fields, as the L-LTF field (for example, in cases when the L-LTF is not being boosted). Each extra tone added to the L-SIG and RL-SIG fields can be transmitted with predetermined BPSK constellations (e.g., ±1).

In one embodiment, the predetermined channel estimation pattern can include positive values for the lower (left) extra tones, and negative values for the upper (right) extra tones. For example, the extra tone values can be [+1 +1] for tone indices −28 and −27 for each 20 MHz sub-channel, and [−1 −1] for tone indices 27 and 28 for each 20 MHz sub-channel.

In another embodiment, the predetermined channel estimation pattern can include values sufficient to minimize the peak-to-average power ratio (PAPR) on the L-SIG and/or RL-SIG. In various embodiments, a PAPR of data symbols can be higher than a PAPR of SIG symbols.

Figure 12:
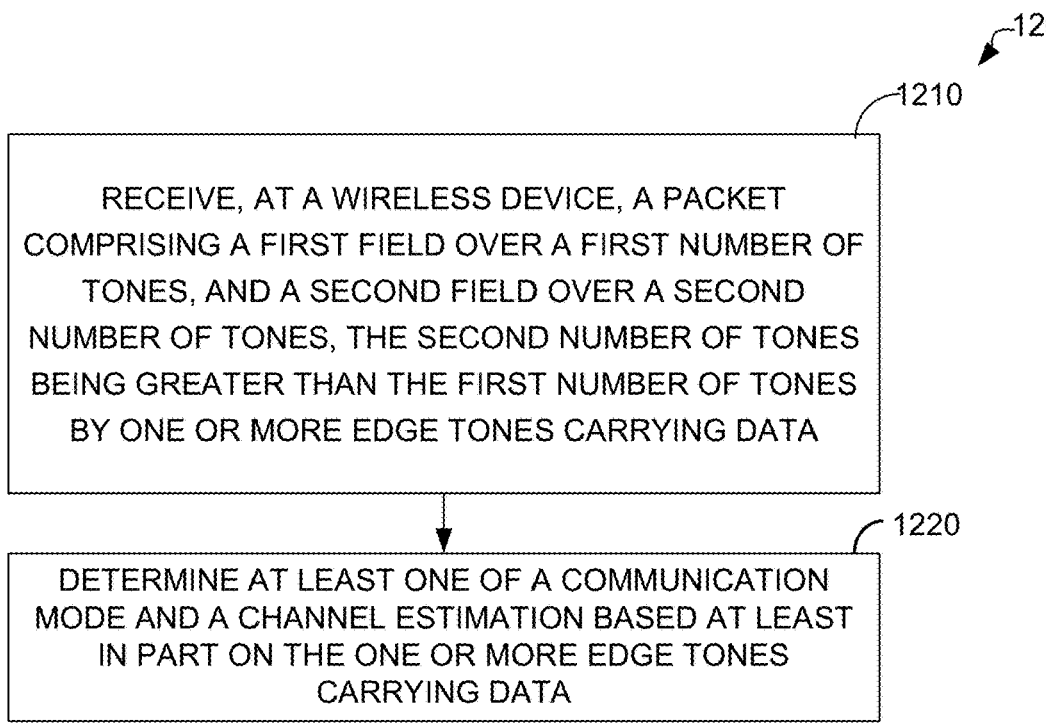
FIG. 12 shows a flowchart for an exemplary method of wireless communication that can be employed within the wireless communication system 100 of FIG. 1.

FIG. 12 shows a flowchart 1200 for an exemplary method of wireless communication that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1, the packets 800 and 900A-900B discussed above with respect to FIGS. 8-9, and the HE-SIG field 1000 discussed above with respect to FIG. 10, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1210, a wireless device receives a packet including a first field over a first number of tones, and a second field over a second number of tones, the second number of tones being greater than the first number of tones by a number of one or more edge tones carrying data. For example, the STA 106 can receive the packet 800 or 900A-900B from the AP 104. The packet 800 can include the L-STF 902 or the L-LTF 904 as the first signal field, and the L-LTF 904 or the L-SIG 906 as the second signal field.

In various embodiments, the first number is 52 and the second number is 56. For example, each 20 MHz portion of the packet 800 can include 52 data tones and 4 edge tones. When the 4 edge tones are used as extra tones to carry data signals, 56 data tones are used.

In various embodiments, the first field includes a legacy short training field and the second field comprises a legacy long training field. For example, the first field can be the L-STF 902, which can include 52 data tones and 4 edge tones. The second field can include the L-LTF 904, which can use 56 data tones (including 4 edge tones carrying data). In various embodiments, fields after the second field can include 56 data tones.

In various embodiments, a polarity of the one or more edge tones carrying data indicates at least one of: a modulation and coding scheme (MCS) of a subsequent field, a delay spread protection mode, and a packet transmission mode. In various embodiments, a polarity of the one or more edge tones carrying data indicates at least a portion of a high throughput long training sequence. In various embodiments, a pattern of the one or more edge tones indicates additional data.

In various embodiments, the method can further include receiving a legacy signal field over the second number of tones. The one or more edge tones of the legacy signal field can carry data. For example, the STA 106 can receive the L-SIG 906, which can carry L-SIG data over 52 regular data tones and additional data over the 4 edge tones.

In various embodiments, the first field can include a legacy long training field and the second field comprises a legacy signal field. For example, the first field can be the L-LTF 904, which can include 52 data tones and 4 edge tones. The second field can include the L-SIG 906, which can use 56 data tones (including 4 edge tones carrying data). In various embodiments, fields after the second field can include 56 data tones. In various embodiments, the one or more edge tones carrying data can be used for channel estimation. A pattern of the one or more edge tones can indicate additional data.

In various embodiments, the one or more edge tones can include two positive polarity tones at each lower edge of each of a plurality of 20 MHz sub-channels, and two negative polarity tones at each upper edge of each of the plurality of 20 MHz sub-channels. In various embodiments, the one or more edge tones can include two tones at each edge of each of a plurality of 20 MHz sub-channels, the one or more edge tones having values sufficient to minimize a peak-to-average power ratio during transmission of the second field.

Next, at block 1220, the wireless device determines at least one of a communication mode and a channel estimation based at least in part on the one or more edge tones carrying data. For example, the one or more edge tones can indicate that the packet is an HE packet or can indicate another communication protocol, MCS, or mode.

In an embodiment, the method shown in FIG. 12 can be implemented in a wireless device that can include a receiving circuit and a determining circuit. Those skilled in the art will appreciate that a wireless device can have more components than the simplified wireless device described herein. The wireless device described herein includes components useful for describing some features of certain implementations.

The receiving circuit can be configured to receive the packet. In some embodiments, the receiving circuit can be configured to perform at least block 1210 of FIG. 12. The transmitting circuit can include one or more of the receiver 212 (FIG. 2), the antenna 216 (FIG. 2), and the transceiver 214 (FIG. 2). In some implementations, means for receiving can include the receiving circuit.

The determining circuit can be configured to determine the transmission mode of the packet. In some embodiments, the determining circuit can be configured to perform at least block 1220 of FIG. 12. The determining circuit can include one or more of the processor 204 (FIG. 2), the memory 206 (FIG. 2), and the DSP 220 (FIG. 2). In some implementations, means for determining can include the determining circuit.

Figure 13:
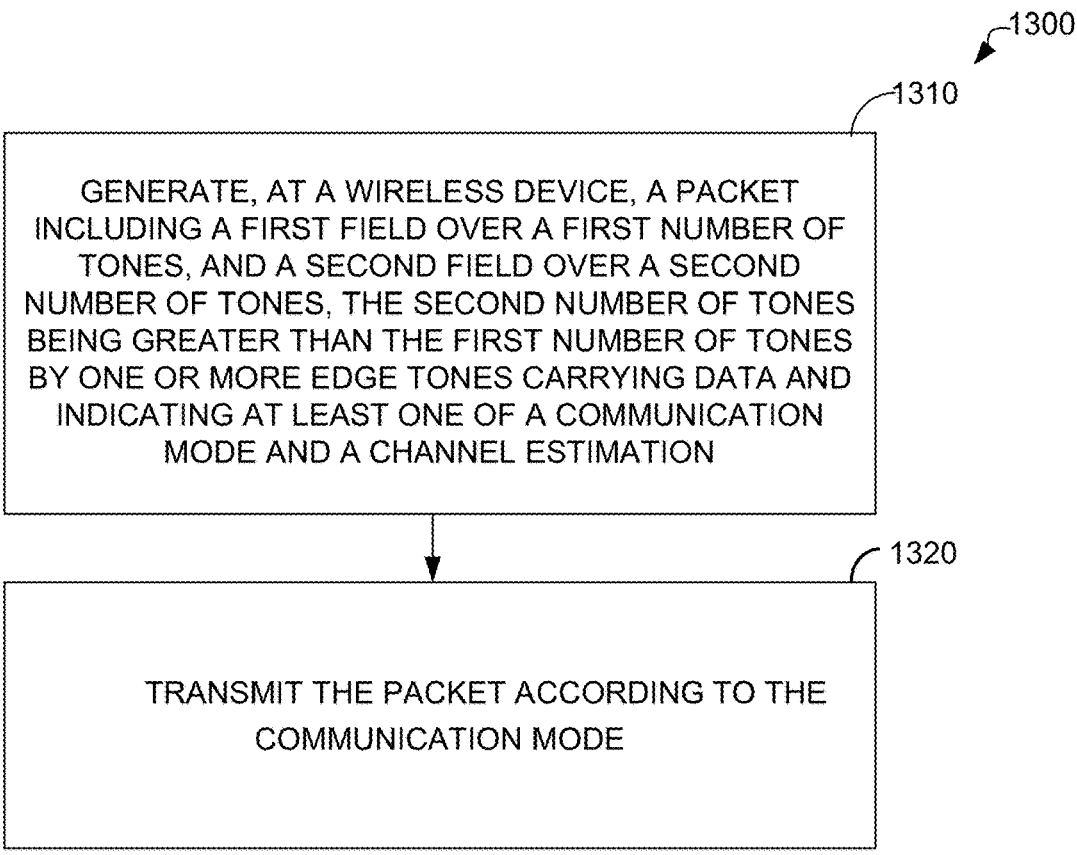
FIG. 13 shows another flowchart for an exemplary method of wireless communication that can be employed within the wireless communication system 100 of FIG. 1.

FIG. 13 shows a flowchart 1300 for an exemplary method of wireless communication that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1, the packets 800 and 900A discussed above with respect to FIGS. 8-9, and the HE-SIG field 1000 discussed above with respect to FIG. 10, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1310, a wireless device generates a packet including a first field over a first number of tones, and a second field over a second number of tones, the second number of tones being greater than the first number of tones by a number of one or more edge tones carrying data. The one or more edge tones carrying data indicate at least one of a communication mode and a channel estimation based at least in part on the one or more edge tones carrying data. For example, the AP 105 can generate the packet 800 or 900A. The packet 800 can include the L-STF 902 or the L-LTF 904 as the first signal field, and the L-LTF 904 or the L-SIG 906 as the second signal field.

In various embodiments, the first number is 52 and the second number is 56. For example, each 20 MHz portion of the packet 800 can include 52 data tones and 4 edge tones. When the 4 edge tones are used as extra tones to carry data signals, 56 data tones are used.

In various embodiments, the first field includes a legacy short training field and the second field comprises a legacy long training field. For example, the first field can be the L-STF 902, which can include 52 data tones and 4 edge tones. The second field can include the L-LTF 904, which can use 56 data tones (including 4 edge tones carrying data). In various embodiments, fields after the second field can include 56 data tones.

In various embodiments, a polarity of the one or more edge tones carrying data indicates at least one of: a modulation and coding scheme (MCS) of a subsequent field, a delay spread protection mode, and a packet transmission mode. In various embodiments, a polarity of the one or more edge tones carrying data indicates at least a portion of a high throughput long training sequence. In various embodiments, a pattern of the one or more edge tones indicates additional data.

In various embodiments, the method can further include transmitting a legacy signal field over the second number of tones. The one or more edge tones of the legacy signal field can carry data. For example, the AP 104 can transmit the L-SIG 906, which can carry L-SIG data over 52 regular data tones, and additional data over the 4 edge tones.

In various embodiments, the first field can include a legacy long training field and the second field comprises a legacy signal field. For example, the first field can be the L-LTF 904, which can include 52 data tones and 4 edge tones. The second field can include the L-SIG 906, which can use 56 data tones (including 4 edge tones carrying data). In various embodiments, fields after the second field can include 56 data tones. In various embodiments, the one or more edge tones carrying data can be used for channel estimation. A pattern of the one or more edge tones can indicate additional data.

In various embodiments, the one or more edge tones can include two positive polarity tones at each lower edge of each of a plurality of 20 MHz sub-channels, and two negative polarity tones at each upper edge of each of the plurality of 20 MHz sub-channels. In various embodiments, the one or more edge tones can include two tones at each edge of each of a plurality of 20 MHz sub-channels, the one or more edge tones having values sufficient to minimize a peak-to-average power ratio during transmission of the second field.

Next, at block 1320, the wireless device transmits the packet according to the communication mode. For example, the AP 104 can transmit the packet 800 or 900A to the STA 106. The extra tones can indicate the transmission protocol, MCS, communication mode, or the like.

In an embodiment, the method shown in FIG. 13 can be implemented in a wireless device that can include a generating circuit and a transmitting circuit. Those skilled in the art will appreciate that a wireless device can have more components than the simplified wireless device described herein. The wireless device described herein includes only those components useful for describing some prominent features of implementations within the scope of the claims.

The generating circuit can be configured to generate the packet. In some embodiments, the generating circuit can be configured to perform at least block 1310 of FIG. 13. The generating circuit can include one or more of the processor 204 (FIG. 2), the memory 206 (FIG. 2), and the DSP 220 (FIG. 2). In some implementations, means for generating can include the generating circuit.

The transmitting circuit can be configured to transmit the packet. In some embodiments, the transmitting circuit can be configured to perform at least block 1320 of FIG. 13. The transmitting circuit can include one or more of the receiver 212 (FIG. 2), the antenna 216 (FIG. 2), and the transceiver 214 (FIG. 2). In some implementations, means for transmitting can include the transmitting circuit.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

As used herein, a phrase referring to "at least one of" a list of items refers to any combination of those items, including single members. As a first example, "at least one of a and b" (also "a or b") is intended to cover a, b, and a-b, as well as any combination with multiples of the same element (e.g., a-a, a-a-a, a-a-b, a-b-b, b-b, b-b-b, or any other ordering of a and b). As a second example, "at least one of: a, b, and c" (also "a, b, or c") is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can include non-transitory computer readable medium (e.g., tangible media). In addition, in some aspects computer readable medium can include transitory computer readable medium (e.g., a signal). Combinations of the above should also be included within the scope of computer-readable media.

The methods disclosed herein include one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method of wireless communication, comprising:
generating, at a wireless device, a packet comprising:
a training field encoded over a first number of data tones, wherein the training field comprises a legacy long training field;
one or more first edge tones adjacent to the training field, wherein the one or more first edge tones carry data;
a signal field comprising a legacy signal field adjacent to the training field and encoded over a second number of data tones and one or more second edge tones adjacent to the second number of data tones, wherein the one or more second edge tones carry channel estimation values; and outputting the packet for transmission to a second device, and
a repeated legacy signal field encoded over the second number of data tones and the one or more second edge tones, wherein the one or more second edge tones of the repeated legacy signal field carry channel estimation values;
wherein the one or more second edge tones comprise two tones at each edge of each of a plurality of 20 MHz sub-channels, the one or more second edge tones having values sufficient to minimize a peak-to-average power ratio during transmission of the signal field.

2. The method of claim 1, wherein the first number is 52 and the second number is 52.

3. The method of claim 1, wherein a polarity of the one or more second edge tones carrying data indicates at least a portion of a high throughput long training sequence.

4. The method of claim 1, wherein a pattern of the one or more second edge tones indicates additional data.

5. The method of claim 4, wherein the one or more second edge tones comprise two positive polarity tones at each lower edge of each of a plurality of 20 MHz sub-channels, and two negative polarity tones at each upper edge of each of the plurality of 20 MHz sub-channels.

6. An apparatus configured to wirelessly communicate, comprising:
a memory that stores instructions;
a processor coupled with the memory and configured to execute the instructions to generate a packet, wherein the packet comprises:
a training field encoded over a first number of data tones, the training field comprising a legacy long training field;
one or more first edge tones adjacent to the training field, wherein the one or more first edge tones carry data;
a signal field comprising a legacy signal field adjacent to the training field and encoded over a second number of data tones and one or more second edge tones adjacent to the second number of data tones, wherein the one or more second edge tones carry channel estimation values; and
a repeated legacy signal field encoded over the second number of data tones and the one or more second edge tones, wherein the one or more second edge tones of the repeated legacy signal field carry channel estimation values; and
a transmitter configured to transmit the packet to a second device;
wherein the one or more second edge tones comprise two tones at each edge of each of a plurality of 20 MHz sub-channels, the one or more second edge tones having values sufficient to minimize a peak-to-average power ratio during transmission of the signal field.

7. The apparatus of claim 6, wherein the first number is 52 and the second number is 52.

8. The apparatus of claim 6, wherein a polarity of the one or more second edge tones carrying data indicates at least one of: a modulation and coding scheme (MCS) of a subsequent field, a delay spread protection mode, and a packet transmission mode.

9. The apparatus of claim 6, wherein a pattern of the one or more second edge tones indicates additional data.

10. The apparatus of claim 9, wherein the one or more second edge tones comprise two positive polarity tones at each lower edge of each of a plurality of 20 MHz sub-channels, and two negative polarity tones at each upper edge of each of the plurality of 20 MHz sub-channels.

11. An apparatus for wireless communication, comprising:
means for generating a packet that comprises:
a training field encoded over a first number of data tones, the training field comprising a legacy long training field;
one or more first edge tones adjacent to the training field, wherein the one or more first edge tones carry data;
a signal field comprising a legacy signal field adjacent to the training field and encoded over a second number of data tones and one or more second edge tones adjacent to the second number of data tones, wherein the one or more second edge tones carry channel estimation values; and means for outputting the packet for transmission to a second device, and
a repeated legacy signal field encoded over the second number of data tones and the one or more second edge tones, wherein the one or more second edge tones of the repeated legacy signal field carry channel estimation values;
wherein the one or more second edge tones comprise two tones at each edge of each of a plurality of 20 MHz sub-channels, the one or more second edge tones having values sufficient to minimize a peak-to-average power ratio during transmission of the signal field.

12. The apparatus of claim 11, wherein the first number is 52 and the second number is 52.

13. The apparatus of claim 11, wherein a polarity of the one or more second edge tones carrying data indicates at least one of: a modulation and coding scheme (MCS) of a subsequent field, a delay spread protection mode, and a packet transmission mode.

14. The apparatus of claim 11, wherein a polarity of the one or more second edge tones carrying data indicates at least a portion of a high throughput long training sequence.

15. The apparatus of claim 11, wherein a pattern of the one or more second edge tones indicates additional data.

16. A non-transitory computer-readable medium comprising code that, when executed, causes an apparatus to:
generate a packet that comprises:
a training field encoded over a first number of data tones, the training field comprising a legacy long training field;

one or more first edge tones adjacent to the training field, wherein the one or more first edge tones carry data;

a signal field comprising a legacy signal field adjacent to the training field and encoded over a second number of data tones and one or more second edge tones adjacent to the second number of data tones, wherein the one or more second edge tones carry channel estimation values; and output the packet for transmission to a second device, and a repeated legacy signal field encoded over the second number of data tones and the one or more second edge tones, wherein the one or more second edge tones of the repeated legacy signal field carry channel estimation values;

wherein the one or more second edge tones comprise two tones at each edge of each of a plurality of 20 MHz sub-channels, the one or more second edge tones having values sufficient to minimize a peak-to-average power ratio during transmission of the signal field.

17. The method of claim 1, wherein the one or more first edge tones is 4.

18. The method of claim 1, wherein the one or more second edge tones is 4.

* * * * *